US012626705B2

(12) United States Patent
Lee et al.

(10) Patent No.: US 12,626,705 B2
(45) Date of Patent: May 12, 2026

(54) APPARATUS AND METHOD FOR MAPPING EMERGENCY CALL DATA MANUAL

(71) Applicant: ELECTRONICS AND TELECOMMUNICATIONS RESEARCH INSTITUTE, Daejeon (KR)

(72) Inventors: Min Jung Lee, Daejeon (KR); Eun Jung Kwon, Sejong-si (KR); Hyun Ho Park, Daejeon (KR); Sung Won Byon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 141 days.

(21) Appl. No.: 18/667,219

(22) Filed: May 17, 2024

(65) Prior Publication Data

US 2024/0395253 A1     Nov. 28, 2024

(30) Foreign Application Priority Data

May 22, 2023     (KR) ........................ 10-2023-0065737

(51) Int. Cl.
| | |
|---|---|
| *G10L 15/16* | (2006.01) |
| *G06F 40/284* | (2020.01) |
| *G06F 40/55* | (2020.01) |
| *G10L 15/26* | (2006.01) |

(Continued)

(52) U.S. Cl.
CPC ............ *G10L 15/26* (2013.01); *G06F 40/284* (2020.01); *G06F 40/55* (2020.01); *H04M 3/5116* (2013.01); *H04W 4/90* (2018.02)

(58) Field of Classification Search
CPC ........ G10L 15/16; H04W 4/90; H04M 3/5116
See application file for complete search history.

(56) References Cited

U.S. PATENT DOCUMENTS

| | | | |
|---|---|---|---|
| 6,327,359 B1 | 12/2001 | Kang et al. | |
| 7,487,095 B2 * | 2/2009 | Hill ..................... | G10L 15/1822 |
| | | | 704/275 |

(Continued)

FOREIGN PATENT DOCUMENTS

| | | |
|---|---|---|
| JP | 2015-233230 A | 12/2015 |
| JP | 2020-95714 A | 6/2020 |

(Continued)

*Primary Examiner* — Shaun Roberts

(57) ABSTRACT

According to an embodiment of the present disclosure, an apparatus for An apparatus for mapping an emergency call data manual, the apparatus comprising: an input unit that receives an emergency call in voice form; a preprocessing unit that converts the voice form into text data and preprocesses the text data to generate an emergency call data token; a keyword detection unit that detects main keywords using a manual and generates a mapping rule using the main keywords; a model generation unit that generates a model by training an artificial intelligence model using manual-mapped data; a manual mapping unit that generates a response manual for the text data by performing mapping based on the mapping rule and emergency call data token and mapping based on the model; and a display unit that displays the response manual.

10 Claims, 3 Drawing Sheets

(51) Int. Cl.
    *H04M 3/51*        (2006.01)
    *H04W 4/90*        (2018.01)

(56)            References Cited

U.S. PATENT DOCUMENTS

| | | | |
|---|---|---|---|
| 8,706,498 B2 * | 4/2014 | George | H04M 3/5166 |
| | | | 379/265.09 |
| 10,853,577 B2 * | 12/2020 | Alexander | G06N 3/045 |
| 11,003,863 B2 * | 5/2021 | Hall | G06F 40/30 |
| 11,133,010 B1 * | 9/2021 | Waldmeier | H04M 3/527 |
| 11,375,063 B1 * | 6/2022 | Frenkel | H04M 3/5166 |
| 2019/0069145 A1 * | 2/2019 | Dantsker | G06F 40/169 |
| 2020/0097814 A1 * | 3/2020 | Devesa | G10L 15/22 |
| 2020/0135005 A1 * | 4/2020 | Katz | H04M 7/0021 |
| 2022/0303380 A1 * | 9/2022 | Martin | H04W 4/90 |
| 2023/0063694 A1 | 3/2023 | Byon et al. | |

FOREIGN PATENT DOCUMENTS

| | | |
|---|---|---|
| JP | 7043719 B2 | 3/2022 |
| KR | 10-1607468 B1 | 3/2016 |
| KR | 10-2021-0075511 A | 6/2021 |
| KR | 10-2022-0041005 A | 3/2022 |

* cited by examiner

APPARATUS AND METHOD FOR MAPPING EMERGENCY CALL DATA MANUAL

CROSS-REFERENCE TO RELATED APPLICATION

The present application claims priority to Patent Application No. 10-2023-0065737, filed on in Korea Intellectual Property Office on May 22, 2023, the entire contents of which are incorporated herein by reference.

TECHNICAL FIELD

The present disclosure relates to an apparatus and method for mapping emergency call data manuals.

BACKGROUND

The contents described below merely provide background information related to the present disclosure and do not constitute prior art.

An emergency call refers to a call for help in the event of an unexpected emergency, such as a call to 119, 112, etc. When an operator receives an emergency call, the ability to understand the situation and respond to the call varies depending on the operator's capability, experience, and real-time conditions. However, in the event of a disaster or incident, the scale of damage may vary depending on the operator's ability to understand the situation and initially respond it. Therefore, there is a need for an apparatus and method that supports rapid and accurate response to emergency calls, regardless of the operator's capabilities and conditions.

SUMMARY

In view of the above, the present disclosure provides an apparatus and method for supporting rapid and accurate response to emergency calls.

The present disclosure provides an apparatus and method for providing a person receiving an emergency call with a response manual appropriate to the content of the call in real time.

The objects to be achieved by the present disclosure are not limited to the objects mentioned above, and other objects not mentioned will be clearly understood by one of ordinary skill in the art from the description below.

According to an embodiment of the present disclosure, an apparatus for An apparatus for mapping an emergency call data manual, the apparatus comprising: an input unit that receives an emergency call in voice form; a preprocessing unit that converts the voice form into text data and preprocesses the text data to generate an emergency call data token; a keyword detection unit that detects main keywords using a manual and generates a mapping rule using the main keywords; a model generation unit that generates a model by training an artificial intelligence model using manual-mapped data; a manual mapping unit that generates a response manual for the text data by performing mapping based on the mapping rule and emergency call data token and mapping based on the model; and a display unit that displays the response manual.

According to an embodiment of the present disclosure, a method for A method for mapping an emergency call data manual, the method comprising: receiving an emergency call in voice form in an input unit; converting the voice form into text data and preprocessing the text data to generate an emergency call data token in a preprocessing unit; detecting main keywords using a manual and generating a mapping rule using the main keywords in a keyword detection unit; generating a model by training an artificial intelligence model using manual-mapped data in a model generation unit; generating a response manual for the text data by performing mapping based on the mapping rule and the emergency call data token and mapping based on the model in a manual mapping unit; and displaying the response manual in a display unit.

According to the present disclosure, by providing to a receiver who receives an emergency call with a response manual appropriate to the content of the call in real time, the receiver can perform efficient reception and response.

The present disclosure enables effective response and initial response to an incident regardless of the call taker's capabilities and conditions.

The present disclosure enables manual mapping and display with rule-based mapping even in the early stages when model-based mapping cannot be accurately performed.

According to the present disclosure, manual mapping accuracy can be increased by performing pseudo mapping using model-based mapping and using the data for model learning even on emergency call data that is not mapped to a manual.

The effects of the present disclosure are not limited to the effects mentioned above, and other effects not mentioned will be clearly understood by one of ordinary skill in the art from the following description.

DETAILED DESCRIPTION

Figure 1:
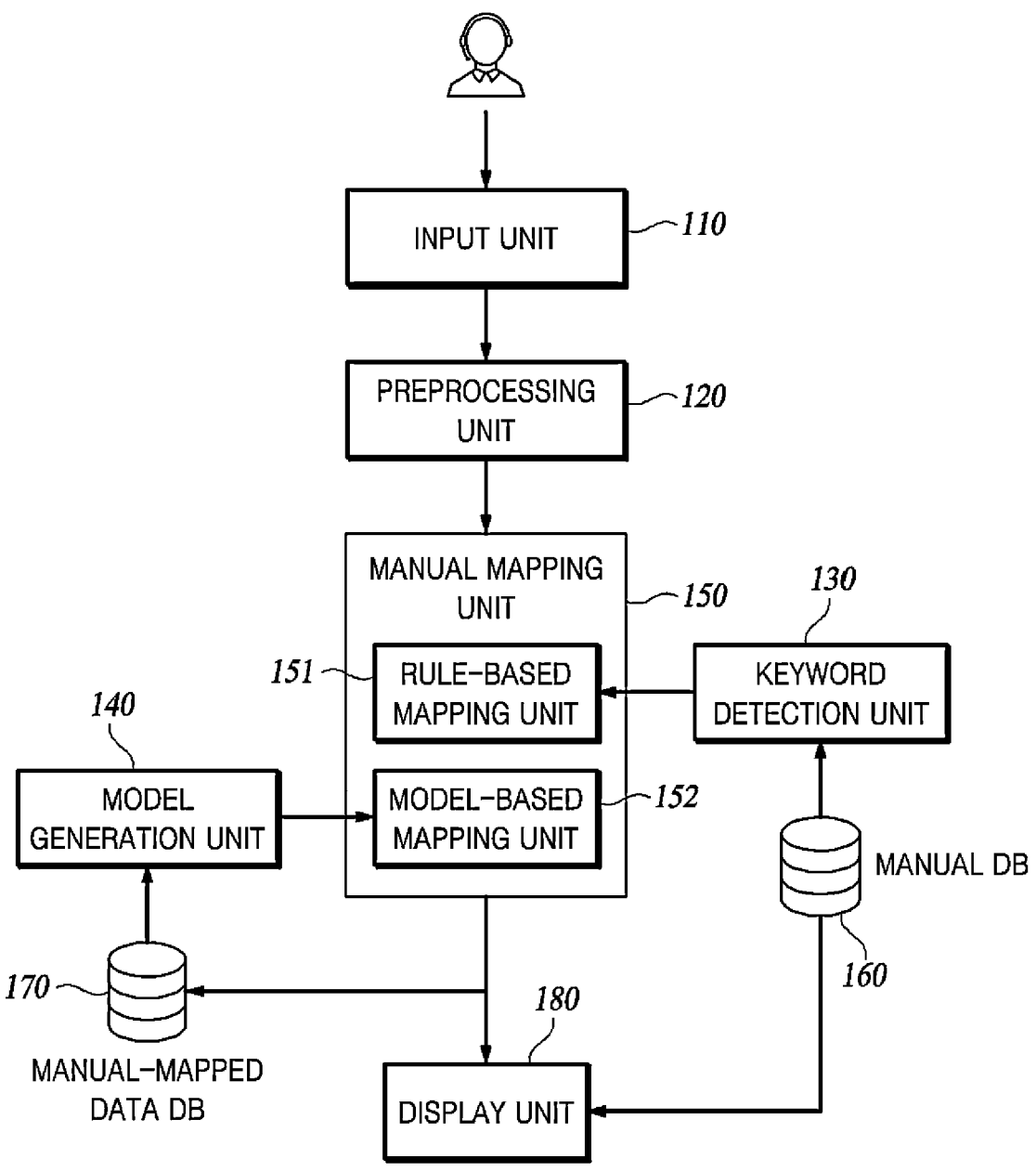
FIG. 1 is a block diagram of an apparatus for mapping emergency call data manuals according to one embodiment of the present disclosure.

Hereinafter, some embodiments of the present disclosure will be described in detail with reference to the accompanying drawings. In the following description, like reference numerals can designate like elements, even though the elements can be shown in different drawings. Further, the following description of some embodiments can omit, for the purpose of clarity and for brevity, a detailed description of related known components and functions when considered obscuring the subject of the present disclosure.

Various ordinal numbers or alpha codes such as "first", "second", "A", "B", "(a)", "(b)" etc., can be prefixed solely to differentiate one component from the other but not to necessarily imply or suggest the substances, order, or sequence of the components. Throughout this specification, when a part "includes" or "comprises" a component, the part is meant to allow for further including other components and to not exclude other components, unless specifically stated to the contrary. Terms such as "unit," "module," and the like can refer to units in which at least one function or operation is processed and they may be implemented by hardware, software, or a combination thereof.

In the present specification, mapping rule and rule have the same meaning, so they will be used interchangeably.

The following detailed description is intended to describe exemplary embodiments of the present invention and is not intended to represent the only embodiments in which the present invention may be practiced.

Embodiments of the present disclosure relate to an apparatus and method for displaying a manual mapped according to the contents of emergency call data.

FIG. 1 is a block diagram of an apparatus for mapping emergency call data manuals according to one embodiment of the present disclosure.

The apparatus for mapping emergency call data manuals according to one embodiment of the present disclosure may include an input unit 110, a preprocessing unit 120, a keyword detection unit 130, a model generation unit 140, a manual mapping unit 150, a display unit 180, and the like. In addition, the apparatus for mapping emergency call data manuals may further include a manual DB 160 storing various manuals and a manual-mapped data DB 170 storing manuals and mapped data.

The input unit 110 receives an emergency call in voice form and transmits it to the preprocessing unit 120.

The preprocessing unit 120 may be configured to convert voice call data into text data using speech-to-text voice recognition technology and preprocess the text data to change it into a data format that can be input to the manual mapping unit 140. In addition, the preprocessor 120 performs refinement operations on the text data (same meaning as emergency call text), such as removing unnecessary words for manual mapping, and performs tokenization, which is an operation to divide the text data into units called tokens.

The keyword detection unit 130 may be configured to detect main keywords using manuals extracted from the manual DB 160 and generate mapping rules for mapping manuals using the detected main keywords. More specifically, the keyword detection unit 130 may be configured to refine and tokenize the manual text data existing in the manual DB 160, calculate the frequency of each token appearing in the entire manual, calculate the importance of each token appearing in each manual, detect a set of main keywords for each manual using the importance, and generate the mapping rule using the set of main keywords.

The model generation unit 140 may be configured to generate a mapping model by learning an artificial intelligence model based on manual-mapped data extracted from the manual-mapped data DB 170.

The manual mapping unit 150 may be configured to map a response manual through two mapping methods. More specifically, when a rule is applied to an emergency call data token through rule-based mapping using the rules generated in the keyword detection unit 130, the manual mapping unit 150 may map the corresponding manual.

The manual mapping unit 150 may be configured to include a rule-based mapping unit 151 and a model-based mapping unit 152 for two mapping methods.

The rule-based mapping unit 151 may be configured to map the corresponding manual by applying the mapping rule generated by the keyword detection unit 130 to the emergency call data token. The manual-mapped data may be stored in the manual-mapped data DB 170.

The model generation unit 140 may be configured to train an artificial intelligence classification model for the manual-mapped data when the number of manual-mapped data stored in the manual-mapped data DB 170 is sufficient for training the classification model. The trained model may be transmitted to the model-based mapping unit 152. In the present specification, the case where the number of the manual-mapped data is sufficient for training the artificial intelligence classification model may mean that the number of the manual-mapped data is greater than or equal to a predetermined value. On the other hand, the case where the number of the manual-mapped data is not sufficient for training the artificial intelligence classification model may mean that the number of the manual-mapped data is less than the predetermined value.

The model-based mapping unit 152 may be configured to perform manual mapping based on the trained model transmitted from the model generation unit 140 and ultimately generate emergency call text data to which the manual is mapped.

Additionally, the manual mapping unit 150 may also be configured to train the model in a semi-supervised learning manner which pseudo-maps unlabeled emergency call data (e.g., unlabeled data) to which no manual is mapped with a predicted value output from the model and utilizes them to train the model.

The display unit 180 may be configured to display emergency call text data to which the manual is mapped. More specifically, the display unit 180 may be configured to visualize to a receiver the result of the change of the emergency call voice data currently being received by the receiver to text data and manual information mapped to this content, if any.

Figure 2:
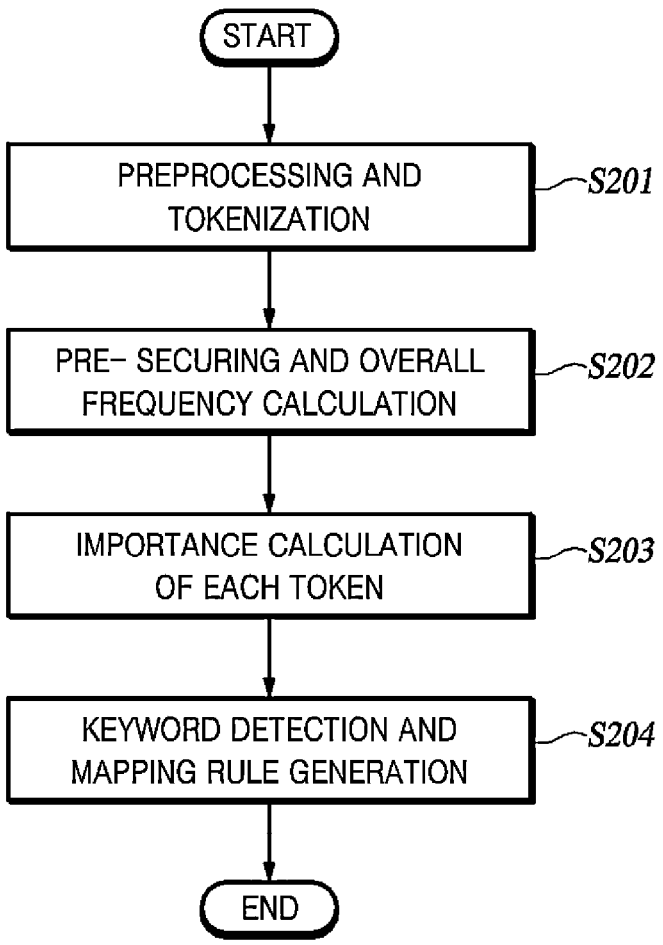
FIG. 2 is a flowchart of the operation of a keyword detection unit of the apparatus for mapping emergency call data manuals according to one embodiment of the present disclosure.

FIG. 2 is a flowchart of the operation of the keyword detection unit 130 of the apparatus for mapping emergency call data manuals according to one embodiment of the present disclosure.

The keyword detection unit 130 performs preprocessing and tokenization procedure in step 201.

In the preprocessing and tokenization procedure, manual text data existing in the manual DB is refined and tokenization is performed. Assuming that the total number of manuals is N, the number of tokens for each manual is $M_1$, $M_2$, . . . , $M_N$.

For example, the token corresponding to manual 1 can be represented as $[token_1, token_2, . . . , token_{M1}]$, the token corresponding to manual 2 can be represented as $[token_1, token_2, . . . , token_{M2}]$, and the token corresponding to manual N can be represented as $[token_1, token_2, . . . , token_{MN}]$.

The keyword detection unit 130 performs pre-securing and overall frequency calculation procedure in step 202.

In the pre-securing and overall frequency calculation procedure, tokens that appear even once in N number of manuals are added in advance. Assuming that there are T number of tokens in advance, the frequency $Freq(token_i)$ of occurrence of the corresponding token tokeni in the entire manual is calculated for each token.

The frequency $Freq(token_i)$ of appearance of the token $token_i$ in the entire manual can be expressed as shown in Table 1 below.

TABLE 1

| $token_i$ | $Freq(token_i)$ |
|---|---|
| $token_1$ | $Freq(token_1)$ |
| . . . | . . . |
| $token_T$ | $Freq(token_T)$ |

The keyword detection unit 130 performs an importance calculation procedure for each token in step 203.

In the importance calculation procedure for each token, an importance S(tokeni) is calculated for the token $token_i$ that appears in each manual. The importance S(tokeni) is calculated by dividing the frequency $Freq_{Manual_j}(token_i)$ of the token tokeni appearing in the manual $Manual_j$ by Freq ($token_i$).

That is, the importance $S(token_i)$ can be expressed as Equation 1 below.

$$S(token_i) = \frac{\text{frequency of } token_i \text{ appearing in manual}}{\text{frequency of } token_i \text{ appearing in entire manuals}} \quad \text{(Equation 1)}$$

That is, the importance can be calculated by dividing the frequency of the token appearing in each manual by the frequency of the token appearing in entire manuals.

The importance of each token can be expressed as [(token$_1$, S(token$_1$)), (token$_2$, S(token$_2$)), . . . , (token$_{M1}$, S(token$_{M1}$))], [(token$_1$, S(token$_1$)), (token$_2$, S(token$_2$)), . . . , (token M$_1$, S(token$_{M2}$))], . . . , [(token$_1$, S(token$_1$)), (token$_2$, S(token$_2$)), . . . , (token$_{M1}$, S(token$_{MN}$))].

The keyword detection unit 130 performs a keyword detection and mapping rule generation procedure in step 204.

In the keyword detection and mapping rule generation procedure, S($token_i$) is used to detect a set of main keywords for each manual and generate rules using the main keywords. When a new manual is added to the manual DB, the keyword detection unit 130 generates rules for the new manual as described above.

The set of keywords for each manual can be expressed as {keyword$_1$, keyword$_2$}, {keyword$_1$, keyword$_2$, keyword$_3$}, . . . , {keyword$_1$, keyword$_2$}.

Figure 3:
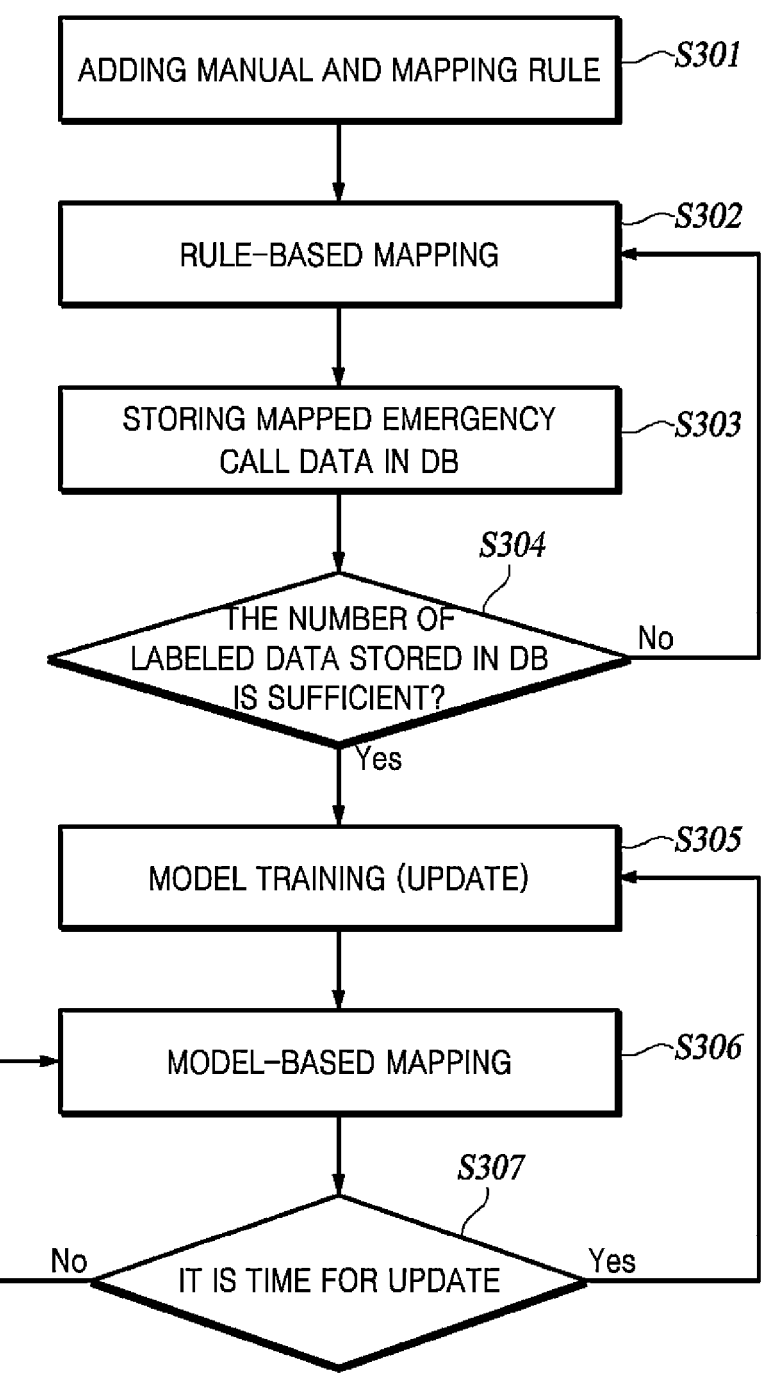
FIG. 3 is a flowchart of the operation of a manual mapping unit of the apparatus for mapping emergency call data manuals according to one embodiment of the present disclosure.

FIG. 3 is a flowchart of the operation of the manual mapping unit of the apparatus for mapping emergency call data manuals according to one embodiment of the present disclosure.

The manual mapping unit 150 may add a manual and a mapping rule in step 301.

The manual mapping unit 150 may perform rule-based mapping by applying the mapping rule generated by the keyword detection unit 130 to the emergency call data token in step 302.

In step 303, the manual mapping unit 150 may store the emergency call data mapped in step 302 in a DB (manual-mapped data DB 170).

In step 304, the manual mapping unit 150 may determine whether the number of labeled data stored in the DB (manual-mapped data DB 170) is sufficient. In the present specification, a sufficient number of labeled data stored in the DB (manual-mapped data DB 170) means that the number of labeled data stored in the DB (manual-mapped data DB 170) is greater than or equal to a predetermined value. On the other hand, an insufficient number of labeled data stored in the DB (manual-mapped data DB (170)) means that the number of labeled data stored in the DB (manual-mapped data DB (170)) is less than the predetermined value.

If the number of labeled data stored in the DB is insufficient, the manual mapping unit 150 may proceed to step 302.

However, if the number of labeled data stored in the DB is sufficient, the manual mapping unit 150 may proceed to step 305 to update the model training. When the number of manual-mapped data stored in the manual-mapped data DB 170 is sufficient for training an artificial intelligence classification model, the model generation unit 140 trains the classification model for the manual-mapped data, and when the trained model is transmitted to the model-based mapping unit 152, the model training in the model-based mapping unit 152 may be updated.

In step 306, the manual mapping unit 150 may perform manual mapping based on the trained model transmitted from the model generation unit 140 to finally generate emergency call text data to which the manual is mapped.

The manual mapping unit 150 may determine whether it is time for an update in step 307.

When it is time for an update, the manual mapping unit 150 may proceed to step 305. However, if it is not time for an update, the manual mapping unit 150 may proceed to step 306.

According to the embodiment of the present disclosure, when the rule is applied to the emergency call data token using a rule-based mapping based on the rules generated in the keyword detection unit, the corresponding manual can be mapped. This is stored in the database, and when the number of manual-mapped data is sufficient to train the artificial intelligence classification model, the classification model can be trained using the mapped data in the model generation unit. The trained model is transmitted to the manual mapping unit to perform model-based mapping. The model is updated periodically. The model generation unit can additionally train the model using a semi-supervised learning method that pseudo-maps emergency call data (unlabeled data) to which no manual is mapped with the predicted value output from the model and uses them to train the model.

According to the embodiment of the present disclosure, it is possible to provide a person receiving an emergency call with a response manual appropriate for the call content in real time, enabling efficient receiving and response.

According to the embodiment of the present disclosure, it is possible to accurately map and display a manual appropriate for the contents of emergency call data based on rules and models, thereby enabling effective response and initial response to an incident regardless of the call taker's capabilities and conditions.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for mapping an emergency call data manual, the apparatus comprising:
  an input unit that receives an emergency call in voice form;
  a preprocessing unit that converts the voice form into text data and preprocesses the text data to generate an emergency call data token;
  a keyword detection unit that detects main keywords using a stored manual and generates a mapping rule using the main keywords;
  a model generation unit that generates a model by training an artificial intelligence model using manual-mapped data;
  a manual mapping unit that generates a response manual for the text data by performing mapping based on the mapping rule and mapping based on the model; and
  a display unit that displays the response manual,
  wherein the manual of the keyword detection unit is extracted from a manual DB, and the manual-mapped data of the model generation unit is extracted from a manual-mapped data DB,
  wherein the keyword detection unit is configured to:
    refine and tokenize manual text data existing in the manual DB;
    calculate a frequency of a token appearing in an entire set of manuals for each token;
    calculate an importance of each token appearing in each manual; and
    detect a set of main keywords for each manual using the importance, and generate the mapping rule using the set of main keywords, and
  wherein the importance is calculated by dividing the frequency of each token appearing in each manual by the frequency of the corresponding token appearing in the entire set of manuals stored in the manual DB.

2. The apparatus of claim 1, wherein the manual mapping unit includes a rule-based mapping unit that when the rule generated by the keyword detection unit is applied to the emergency call data token, maps the corresponding manual.

3. The apparatus of claim 2, wherein the wherein the importance is calculated according to the following equation, in which S is an importance of a token i:

$$S(\text{token}_i) = \frac{\text{frequency of token}_i \text{ appearing in manual}}{\text{frequency of token}_i \text{ appearing in entire set of manuals}}.$$

4. The apparatus of claim 2, wherein the manual mapping unit includes a model-based mapping unit that performs manual mapping based on the model generated by the model generation unit when the number of the manual-mapped data is greater than or equal to a predetermined value.

5. The apparatus of claim 1, wherein the manual mapping unit is further configured to pseudo-map unlabeled emergency call data to which no manual is mapped with a predicted value output from the model.

6. A method for mapping an emergency call data manual, the method comprising:

receiving an emergency call in voice form in an input unit;

converting the voice form into text data and preprocessing the text data to generate an emergency call data token in a preprocessing unit;

detecting main keywords using a stored manual and generating a mapping rule using the main keywords in a keyword detection unit;

generating a model by training an artificial intelligence model using manual-mapped data in a model generation unit;

generating a response manual for the text data by performing mapping based on the mapping rule and mapping based on the model in a manual mapping unit; and displaying the response manual in a display unit, wherein the manual of the keyword detection unit is extracted from a manual DB, and the manual-mapped data of the model generation unit is extracted from a manual-mapped data DB, wherein generating the mapping rule includes:

refining and tokenizing manual text data existing in the manual DB;

calculating a frequency of a token appearing in an entire set of manuals for each token;

calculating an importance of each token appearing in each manual; and detecting a set of main keywords for each manual using the importance, and generating the mapping rule using the set of main keywords, and wherein the importance is calculated by dividing the frequency of each token appearing in each manual by the frequency of the token appearing in the entire set of manuals.

7. The method of claim 6, wherein the manual mapping unit is further configured to, when the rule generated by the keyword detection unit is applied to the emergency call data token, map the corresponding manual.

8. The method of claim 7, wherein the manual mapping unit is further configured to perform manual mapping based on the model generated by the model generation unit when the number of the manual-mapped data is greater than or equal to a predetermined value.

9. The method of claim 6, wherein the manual mapping unit is further configured to pseudo-map unlabeled emergency call data to which no manual is mapped with a predicted value output from the model.

10. The method of claim 6, wherein the importance is calculated according to the following equation, in which S is an importance of a token i:

$$S(\text{token}_i) = \frac{\text{frequency of token}_i \text{ appearing in manual}}{\text{frequency of token}_i \text{ appearing in entire set of manuals}}.$$

* * * * *